May 31, 1960     S. C. TITCOMB     2,938,501
HYDRAULIC DRIVE AND CONTROL APPARATUS
Filed Nov. 25, 1957     5 Sheets-Sheet 1

FIG. 1.

INVENTOR
STANLEY C. TITCOMB

BY Donald F. Voss
ATTORNEY

May 31, 1960     S. C. TITCOMB     2,938,501
HYDRAULIC DRIVE AND CONTROL APPARATUS
Filed Nov. 25, 1957     5 Sheets-Sheet 3

May 31, 1960 S. C. TITCOMB 2,938,501
HYDRAULIC DRIVE AND CONTROL APPARATUS
Filed Nov. 25, 1957 5 Sheets-Sheet 4

United States Patent Office 2,938,501
Patented May 31, 1960

2,938,501

HYDRAULIC DRIVE AND CONTROL APPARATUS

Stanley C. Titcomb, Endicott, N.Y., assignor to International Business Machines Corporation, New York, N.Y., a corporation of New York Filed Nov. 25, 1957, Ser. No. 698,840

22 Claims. (Cl. 121—38)

This invention relates to hydraulic apparatus and more particularly to hydraulic apparatus for rapidly moving an element at a predetermined time and then bringing the same to rest precisely at a predetermined position.

In many instances in the operation of machines, it is necessary to move a driven member or element at a predetermined time and bring the same to rest precisely at a predetermined position. One application for this type of drive is found in business or other like type of machines for operating upon record cards. Machines of the type mentioned often require that the record cards be transported to an operating station, such as a punch station or the like, where perforations are entered into the record card at precise index positions as the cards are accurately registered in a rest position.

In order for the cards to be punched at the same rate as they are being fed through the machine, it is necessary to accelerate the cards from the feeding station and then rapidly decelerate the cards to a rest position at the punch station.

Heretofore, it has been customary to utilize mechanical drives for transporting the record cards. While these various mechanical drives operate reasonably satisfactorily at lower speeds, the inertia and control problems involved in their operation at the higher and higher speeds demanded in these type of machines require that other types of drives be utilized.

In this invention the hydraulic apparatus is arranged to be operated in accordance with the principles involved in a constant volume system, thereby eliminating costly pressure regulating controls which would be involved in the operation of a constant pressure system. Further, a constant volume system is not sensitive to load variations, since the degree of pressure required for operation is always available. Also this system provides for a high-speed drive with smooth acceleration and deceleration and with a minimum amount of shock to associated mechanism.

A principal object of this invention is to provide an improved hydraulic drive for rapidly accelerating and decelerating a driven member and bringing the same to rest at a predetermined position.

Another object of this invention is to provide an improved hydraulic drive for operating a driven member intermittently which is insensitive to load variations.

A further object of this invention is to provide a hydraulic drive for a driven member which is of simple construction.

A still further object of this invention is to provide an improved hydraulic drive for a driven member which is controlled by a predetermined displacement of the driven member.

In accordance with the invention, the load such as a record card is to be cyclically driven or transported in timed relation to other parts of a machine, for example, one which operates upon record cards. A constant volume of fluid is supplied directly to a hydraulic motor and a motor by-pass duct or conduit while the return of the fluid from the motor and the motor by-pass to a reservoir is under the control of a pair of reciprocatable spool valves. One of these valves is reciprocated by a continuously rotating eccentric cam operating in synchronism with the other pars of the machine while the other valve is operated by an eccentric cam connected for rotation by the motor. The continuously rotating cam reciprocates the associated valve to permit operation of the motor and after the motor turns a predetermined amount, the other valve is reciprocated by the motor driven cam to stop operation of the motor. As the motor comes to a stop, an aligner mechanism accurately positions the motor shaft and thereby accurately registers the position of the record card in the machine such as at a punch station.

Other objects of the invention will be pointed out in the following description and claims and illustrated in the accompanying drawings, which disclose, by way of examples, the principle of the invention and the best mode, which has been contemplated, of applying that principle.

Figure 1:
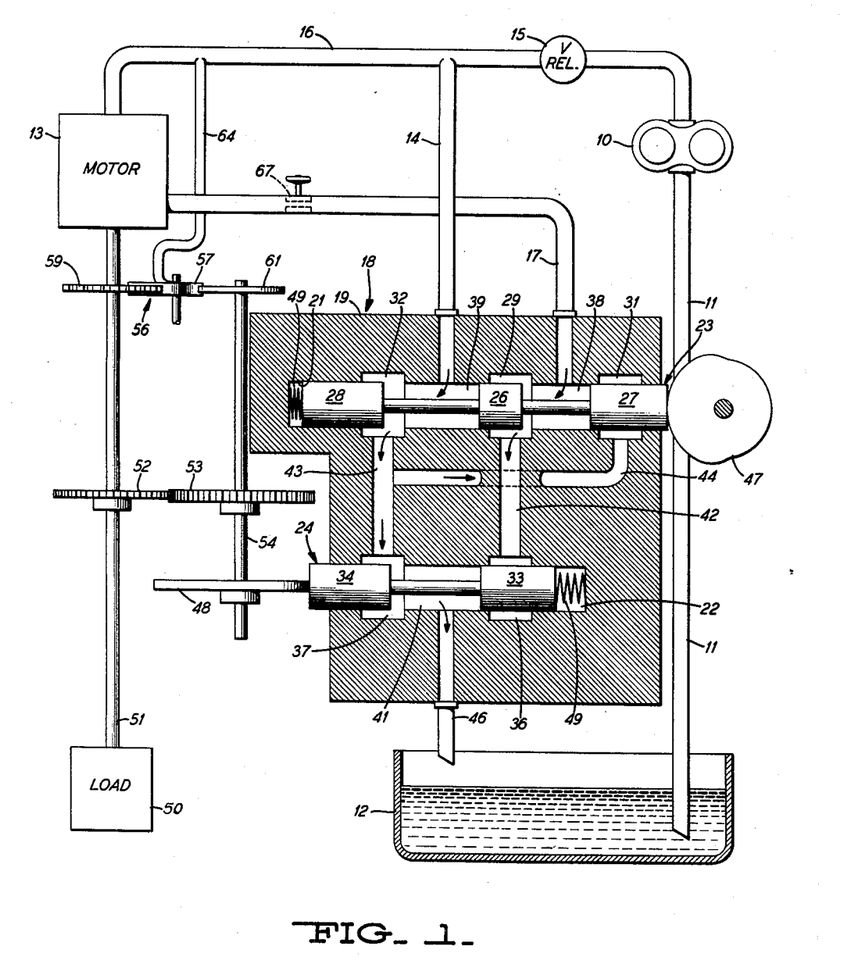
Fig. 1 is a diagrammatic view of the hydraulic drive for one embodiment of the invention with the control means therefor partially in section.

Referring to the drawings and particulaly to Fig. 1, the invention is shown, by way of example, as an arrangement of apparatus for effecting the improved hydraulic drive and includes a constant volume displacement pump 10 having an inlet connected by means of a duct 11 to a suitable sump or reservoir 12 for suitable fluid. The pump 10 discharges a constant volume of fluid through a conduit 16 provided with the usual relief valve 15 and leading directly to a hydraulic motor 13 and to a motor by-pass conductor or conduit 14. The discharge or exhaust side of the hydraulic motor 13 is connected by means of a conduit 17 to a hydraulic control mechanism 18. The motor by-pass conduit 14 is also directly connected to this hydraulic mechanism 18 which comprises a cored housing 19 having a pair of first and second parallel cylindrical bores 21 and 22 with reciprocatable first and second slide or spool-type control valve means 23 and 24, respectively, disposed therein.

The first spool valve 23 includes a central land 26 disposed between spaced end lands 27 and 28, respectively, which are adapted to overlap and control fluid flow through related recessed ports 29, 31 and 32, respectively. The second spool valve 24 has a pair of spaced end lands 33 and 34 which are adapted to control related recessed ports 36 and 37, respectively. Additionally, the lands of the first spool valve 23 lie within the first cylindrical bore 21 to provide right and left hand fluid conducting chambers 38 and 39, respectively, disposed on opposite sides of the central land 26. Likewise the lands of the second spool valve 24 lie within the second cylindrical bore 22 to form a fluid conducting chamber 41 between the lands 33 and 34. As shown, the recessed port 29 is in direct communication with the recessed port 36 by means of a fluid conducting passage 42, while the recessed port 32 is in direct communication with the recessed port 37 by means of a fluid conducting chamber or passage 43. Further a fluid conductor or passage 44 connects the recessed port 31 with the passage 43 and the fluid chamber 41 is connected with the reservoir 12 by a conduit 46 extending from the housing 19. The conduit 17 from the discharge side of the motor is connected to communicate with the chamber 38 and the motor by-pass conduit 14 communicates with chamber 39. The spool valves control flow of the fluid through the related recessed ports to the communicating fluid conducting chambers in a manner to be described hereinafter.

In order to cyclically reciprocate the control valves 23 and 24 to selectively direct fluid under pressure from the motor 13 and motor by-pass 14 to the reservoir 12, a pair of shaft-driven rotatable eccentric cams 47 and 48, respectively, are provided, one for each control valve. These cams engage the related control valves 23 and 24, respectively, and are effective to reciprocate the same within limits in a predetermined time relation dependent upon their respective shaft rotations. Disposed on the opposite side of each control valve is a suitable compression spring 49 to continuously urge the control valves against the related eccentrics to follow the same. The cam 47 is continuously rotated by any suitable means for synchronous rotation while the cam 48 is driven or rotated by the motor 13.

The motor 13 is adapted to drive a load or driven member 49 through a drive shaft 51 which has a gear 52 disposed thereon meshing with a gear 53 fixed to a parallel jack shaft 54. The cam 48 is fixed to the shaft 54 and rotates therewith. Operation of the motor 13 is controlled by the hydraulic mechanism 18 through the selective actuation of the first and second control valves 23 and 24.

Figure 7:
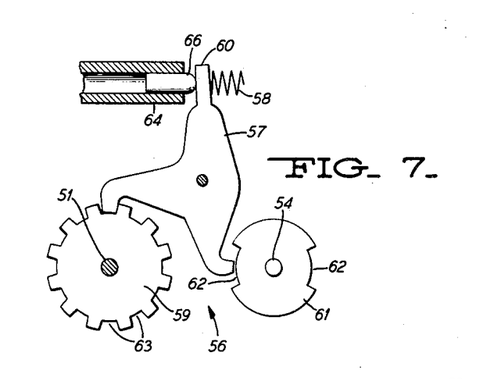
Fig. 7 is a detail view of the aligner mechanism for the hydraulic drive with the latch seated in the aligner wheels.

Before discussing the operation of the control valves 23 and 24, the operation of a hydraulically operated aligner mechanism 56 will be described. Generally, the function of the aligner mechanism 56 is to accurately position the motor shaft 51. The aligner mechanism 56 comprises a pivotally mounted, multiarmed latch 57 normally biased by a compression spring 58 so that projections extending from the ends of the arms of the latch are urged to enter into notches of a fine registration aligner wheel 59 fixed to the shaft 51 and a coarse registration aligner 61 wheel fixed to the parallel shaft 54. The aligner wheel 61 in this example, is provided with two notches 62 equally spaced about the periphery thereof or diametrically opposite each other, while the aligner wheel 59 has twelve notches 63 spaced about its periphery. The notches 63 in the aligner wheel 59 are less in width than the notches 62 in the aligner wheel 61. With this arrangement, projecting portions from the arms of the latch 57 will enter the proper notch in the aligner 59 wheel when permitted by the notch 62 in the aligner wheel 61; otherwise, the latch rides on the periphery of the aligner wheel 61. Once the latch 57 is positioned into the notches of the aligner wheels, as shown in Fig. 7, it aligns the shaft 51 and hence the load in an accurate position.

The latch 57 is actuated to disengage from the notches of the aligner wheels hydraulically. This is accomplished by means of a conduit 64 connecting with the conduit 16 which directs fluid under pressure against a piston 66 disposed at the end of the conduit 64 and extending therefrom to bear against an arm 60 of the latch 57 in opposition to the compression spring 58. The normal operating pressure in the conduit 64 is sufficient to maintain the piston 66 in contact with the latch 57 and the compression spring prevents the piston from being forced out of the conduit 64 when pressure rises in the conduit 64 to actuate the piston 66.

Figure 8:
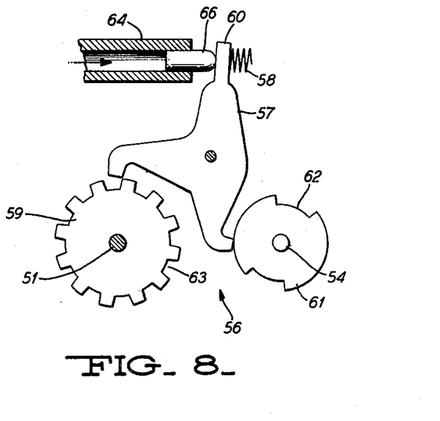
Fig. 8 is a detail view of the aligner mechanism with the latch held out of engagement with the aligner wheels by riding on the periphery of the coarse aligner wheel and thereby prevented from entering a notch in the fine aligner wheel.

As previously stated, the compression spring 58 urges the latch 57 into the notches of the aligner wheels and thereby accurately registering the motor shaft 51. Hence before the motor 13 can operate, the latch 57 must be disengaged from the associated aligner wheels 59 and 61. When the motor 13 is permitted to operate by action of the control mechanism 18 through the operation of the first control valve 23, fluid in the conduit 64 momentarily builds up in pressure due to the motor inertia which must be overcome in the starting of the motor. This momentary increase in fluid pressure is reflected in the conduit 64 and acts against the piston 66 to move the same to overcome the action of the compression spring 58 and thereby disengage the latch 57 from the aligner wheels 59 and 61. As the motor starts to turn, the pressure in the conduit 64 drops to operating pressure and this pressure is not sufficient to overcome the biasing force of the spring 58. However, the latch 57 cannot enter one of the notches of the fine aligner wheel 59 since it is riding on the periphery of the coarse aligner wheel 61. As the load shaft 51 is rotated by the motor 13 the fine aligner wheel 59 rotates $5/12$ of a revolution while through the gearing the coarse aligner wheel 61 rotates $1/2$ of a revolution. Hence the periphery of the coarse aligner wheel prevents the latch 57 from entering the notches of the fine aligner wheel before the proper notch is present, as shown in Fig. 8.

As just stated, the motor 13 is permitted to operate by action of the control mechanism 18 through operation of the first valve 23. The various extreme positions of the control valves 23 and 24 during certain portions of their cyclic operation is shown in Figs. 1 to 4 inclusive.

Referring to Fig. 1, the motor is in a stopped position with the latch 57 engaged with the aligned wheels as shown in Fig. 7. The first control valve 23, as shown in Fig. 1, follows its cam 47 and is shifted to the extreme left. This positions the central control land 26 and the end lands 27 and 28 to connect the motor by-pass conduit 14 to the reservoir 12 by means of the chamber 39, the open end port 32, passage 43, the end port 37 of the second control valve 24 and the chamber 41 connected to the reservoir 12 by means of the conduit 46. The motor return conduit 17 under the condition mentioned is connected to the passage 42 by means of the chamber 38 and the open central port 29.

With the first control valve 23 in the position above-described, the second control valve 24 is held against its cam 48 by means of its related spring 49 and in this instance is stationary. Thus the valve 24 is to the left so as to position the end land 33 to close the end port 36 and thereby prevent fluid under pressure to flow from the passage 42 to the chamber 41. Also, movement of the valve 24 to the left, positions the end land 34 to direct fluid under pressure from the passage 43 through the now open end port 37 to the chamber 41 of the second control valve 24 as previously described.

Under the above conditions it is readily seen that the fluid in the motor return conduit 17 is prevented by the control mechanism 18 from draining to the reservoir and thereby motion of the motor 13 is prevented. Furthermore, since the fluid in the conduit 16 may flow to the reservoir 12 via the motor by-pass conduit 14 and control mechanism 18, the latch 57 is maintained in the aligner wheels by the spring 58. The above positions of the valves 23 and 24 represent the dwell time interval of the load or driven member 50.

Figure 2:
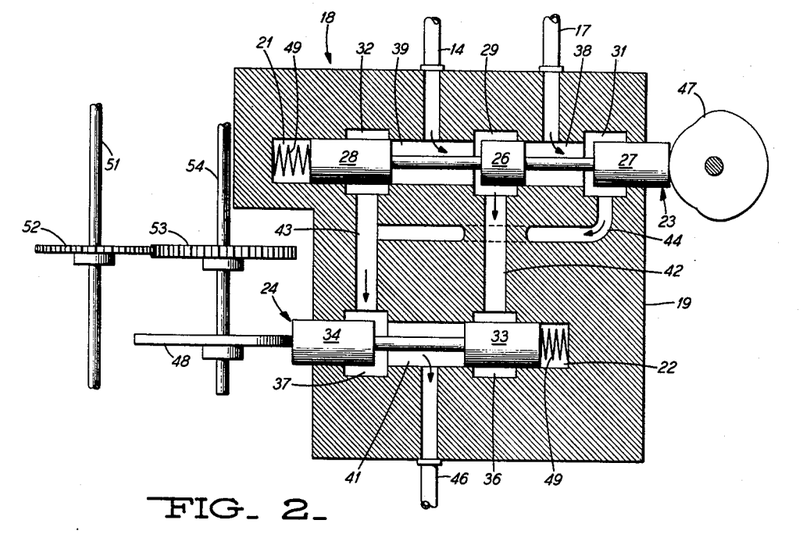
Figs. 2 to 4, inclusive, are diagrammatic views of the various extreme positions of the control valves during different phases of the cycle of operation.

As the cam 47 rotates in synchronism, the point is reached wherein the first valve 23 has been reciprocated to the right, as shown in Fig. 2. Hence the motor return conduit 17 placed in communication with the passage 43 by means of the chamber 38, the now open port 31 and the connecting passage 44, and the passage 43 still communicates with the reservoir 12 by means of the open end port 37, the chamber 41 and the conduit 46. Hence, fluid under pressure from the pump 10 passes through the conduit 16 to the motor 13 to rapidly accelerate the same and through the motor return path conduit 17 and the control mechanism 18 to the reservoir 12. As previously stated, prior to the motor movement, fluid pressure rises in the conduit 64 as motor inertia is being overcome, and thereby the piston 66 is actuated to disengage the latch 57 from the aligner wheels to permit the motor shaft 51 to be rotated by the motor 13.

Figure 3:
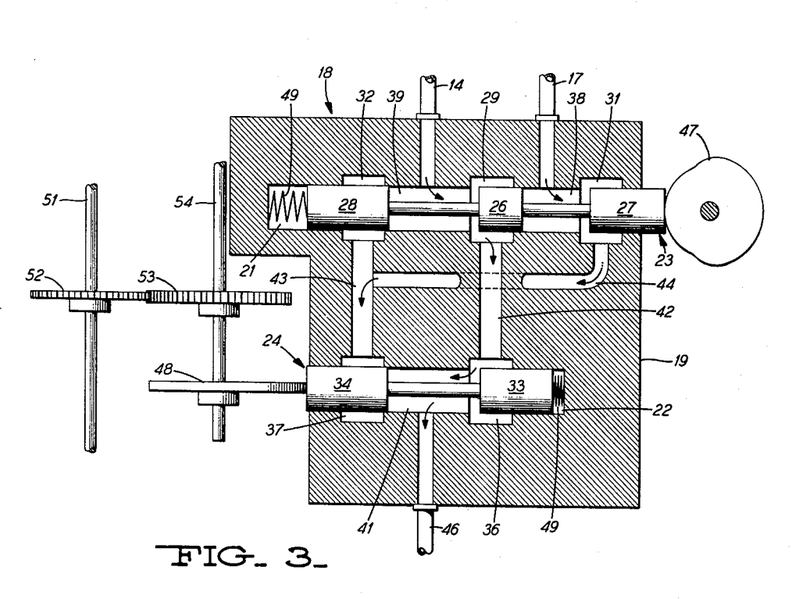

As the motor shaft 51 is rotated, the shaft 54 is rotated through the gearing 52 and 53, respectively, to rotate the cam 48. The cams 47 and 48 are now rotating simultaneously but the cam 47 is still dwelling and hence the first control valve 23 is not shifted; however, the cam 48 shifts the second control valve 24 to the right as shown in Fig. 3. The shifting end land 33 reaches a point to direct fluid from the passage 42 to the reservoir 12 through the now open port 36, the chamber 41 of the second control valve and the conduit 46. Since the first control valve 23 has not been shifted at this time, the chamber 42 still communicates with the motor by-pass conduit 14 through the open port 29 and the chamber 39.

Therefore, under the above conditions, the motor by-pass conduit 14 communicates with the reservoir 12. As the second control valve shifts by action of the cam 48, flow of fluid from the motor return conduit 17 to the reservoir 12 via the chamber 38 and the port 37 is cutoff by shifting the land 34 of the valve 24. Accordingly, since the fluid under pressure is prevented from flowing from the motor return conduit 17 to the reservoir 12, the rapid increase in back pressure will quickly decelerate the motor. Also at this time one of the notches 62 in the aligner wheel 61 is in position to permit the latch to engage the aligner wheels 59 and 61, respectively, and thereby accurately register the position of the shaft 51. However, to control or effect smooth deceleration of the motor, an orifice 67 is provided in the motor return conduit 17.

Since the fluid pressure increases in the motor return conduit 17 at the instant the second valve 24 cuts off fluid flow to the reservoir 12, this rise in pressure may cause the motor 13 to oscillate considerably before the motor 13 stops or settles down; however, the orifice 67 reduces this fluid pressure rise in a predetermined manner to permit the motor 13 to decelerate and come to a smooth stop and to permit the latch 57 to engage the aligner wheels 59 and 61, respectively, without overthrow. Of course, as the motor 13 decelerates, fluid under pressure flows through the motor by-pass conduit 14 and the control mechanism 18 to the reservoir 12 in the usual manner.

Figure 4:
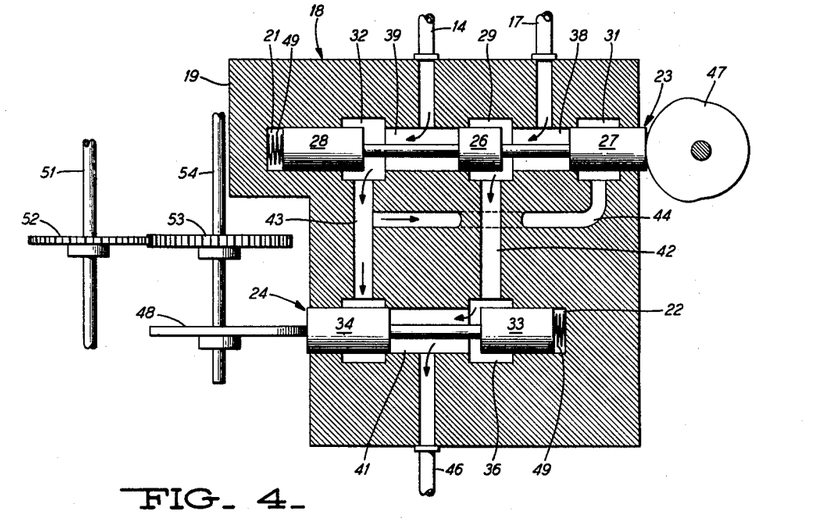

During this interval as the cam 47 continues to rotate, the first valve 23 is reciprocated to the left by action of the cam 47 overcoming the biasing force of the spring 49 while the second control valve 24 remains in position with the right-hand end port 36 open and the left-hand end port 37 closed, as shown in Fig. 4.

In shifting the first valve 23 to the left, the central land 26 shifts to close the left-hand side and to open the right-hand side of the port 29, respectively. Also the end land 27 shifts to close the port 31 and the end land 28 shifts to open the port 32. Under these conditions, fluid under pressure is directed from the motor return conduit 17 to the reservoir 12 by means of the chamber 38, the open port 29, the passage 42, the open port 36, the chamber 41 and the conduit 46. Fluid under pressure is also directed from the motor by-pass conduit 14 to the chamber 39, through open port 32 to the passage 43, wherefrom fluid flow is blocked by the closed ports 31 and 37. The instant the motor return conduit 17 communicates with the reservoir 12 is the time the central land 26 cuts off the left-hand side and opens the right-hand side of the port 29. When this occurs, the inertia of the motor increases fluid pressure in the conduit 64 to actuate the piston 66 and thereby disengaging the latch 57 from the aligner wheels 59 and 61, respectively.

With the motor shaft 51 free to turn, the motor 13 accelerates rapidly to drive the load or driven member 50. The shaft 54 is also rotated by the shaft 51 through the gears 52 and 53, thereby rotating the cam 48 to permit the spring 49 to reciprocate the second control valve 24 to the left. In shifting the second control valve 24 to the left, the right-hand land 33 closes the related port 36, and the left-hand land 34 opens the related port 37, as shown in Fig. 1. Hence, flow of fluid under pressure from the motor return conduit 17 to the reservoir is cut off, and fluid under pressure from the motor by-pass conduit 14 is directed to the reservoir 12. During rotation of the motor 13, the latch 57 is urged by the spring 58 to engage the aligner wheels, since fluid pressure in the conduit 64 has restored to normal operating pressure after the motor inertia in starting was overcome. However, since a notch in the aligner wheel 61 is not in register with the latch 57 as the motor rotates, the latch rides on the periphery of the coarse aligner wheel 61.

As the motor 13 comes to a stop, one of the notches 62 is present to permit the latch 57 to enter into the proper notch 63 of the aligner wheel 59. Thus the first and second valves 23 and 24 have completed a full cycle as indicated on the timing diagram in Fig. 9 and further control valve operation from this point would be repeated in a cyclical manner.

In this particular example, the eccentrics or cams 47 and 48 operate at one-half the required speed of a load motion or driven member cycle because the complete shifting of the control valves applies a fluid pressure drive twice for each complete revolution of the control valve cams. The timing for this action as well as for motor and aligner mechanism operation is shown in Fig. 9.

Figure 9:
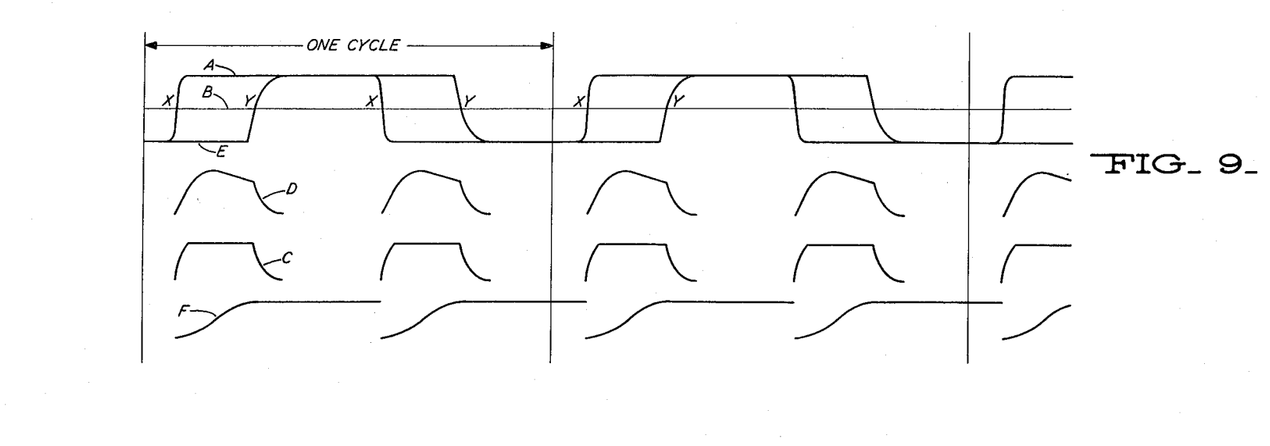
Fig. 9 is a timing diagram showing the control valve operation for effecting an intermittent drive.

As shown in the timing diagram of Fig. 9, the first control valve 23 is moved or laterally shifted by its related cam 47 to follow along the curve A in a cyclical manner with respect to a horizontal neutral or cutoff line B. When this control valve motion crosses the neutral line B, extends above the same and returns in a cyclic manner, the central land 26 passes from one to the other side of the port 29. At each point where the first control valve 23 crosses the neutral line B, indicated at X, the control land 26 moves to cut off the passage of fluid under pressure from the chamber on one side of the central land 26, and transfers the same to the chamber on the opposite side. Simultaneous with this action, of course, the latter chamber is cut off from its related exhaust port while the former is connected to exhaust. This action just described is clearly shown in Figs. 1 and 2. In Fig. 1 the central land 26 of the control valve 23 is in position to permit fluid under pressure to pass from the chamber 38 to the passage 42 through the open port 29 while fluid under pressure also passes from the chamber 39 through the open exhaust port 32 to the chamber 43. In Fig. 2, the control valve having been shifted to cross the neutral line B, the exhaust port 32 is closed and the chamber 38 connected to exhaust at the port 31.

During this action, the second control valve 24 has not moved, since the motor 13 has not turned to rotate the cam 48. However, when the first control valve crossed the neutral line, the latch 57 started to disengage from the aligner wheels 59 and 61 and the motor 13 started turning, as shown by the curves C and D, respectively. As the motor 13 turns, the cam 48 is rotated to laterally move or shift its related second control valve 24 to follow along the curve E. As this control valve motion crosses the neutral line B, the flow of fluid from the motor 13 to the reservoir is cut off and the motor decelerates to a stop as shown in the motor displacement curve F.

The duration of the flow of fluid under pressure from the motor 13 to reservoir is determined or controlled by the phase angle difference between the cams 47 and 48. This phase angle difference may be adjusted as desired. Also in this instance, the rate of rise of the cam 48 is less than that of the cam 47, since the motor 13, as it accelerates, turns the cam 48 quite rapidly. Thus assuming the first valve 23 is leading the second valve 24 over the neutral line B, it is seen that at point X, fluid under pressure flows from the motor 13 to the reservoir and cutoff occurs at point Y. The duration of cutoff, or the time the fluid under pressure is prevented from flowing from the motor 13 to the reservoir, is represented by the distance from Y—X. This distance can be changed, if desired, by changing the period of the cam 47 for operating the first control valve 23. Hence, by shifting the phase angle difference, the duration of the driving pulse or motor operation may be varied over a wide range.

Figure 5:
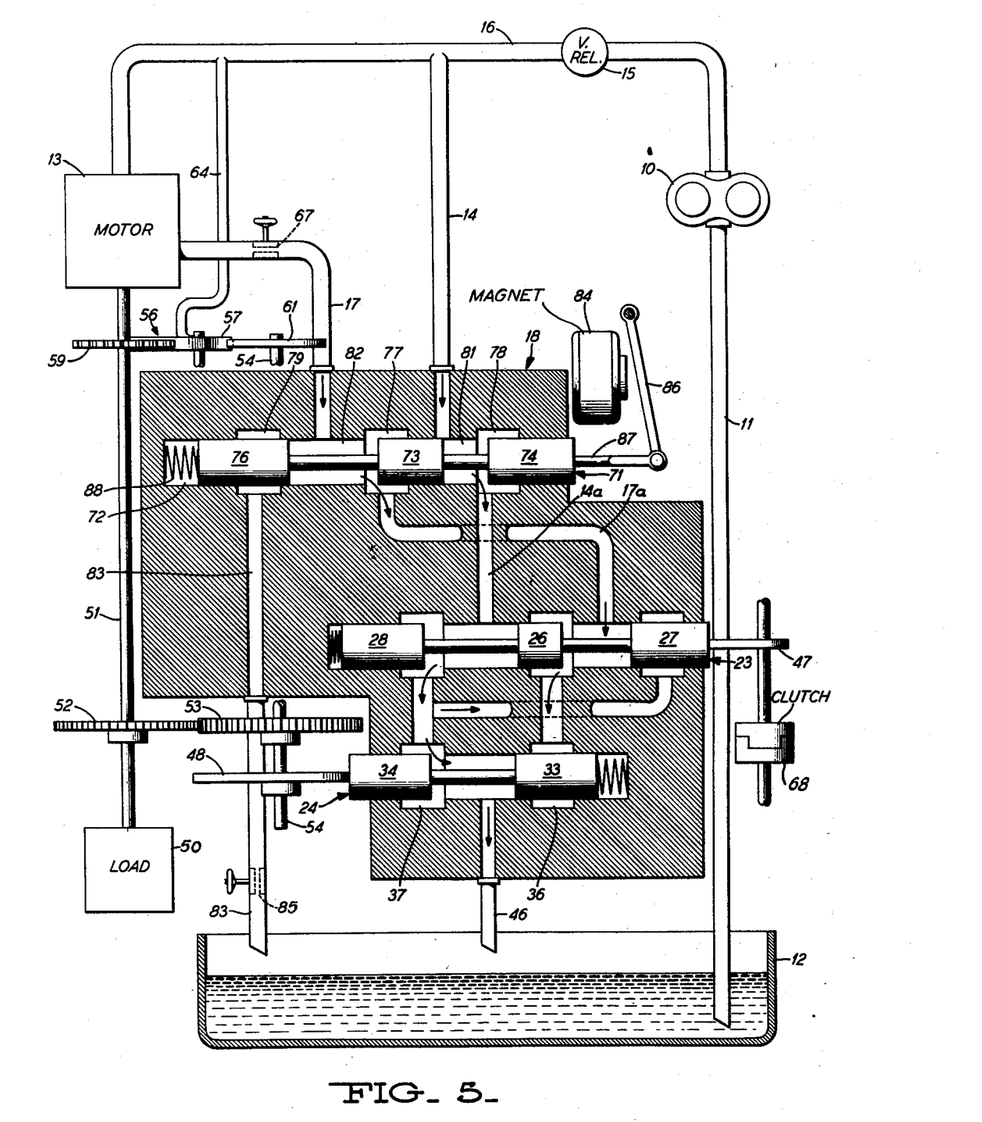
Fig. 5 is a diagrammatic view of the hydraulic drive in Fig. 1 provided with a magnetically operable control valve to by-pass the control means of Fig. 1.
Figure 6:
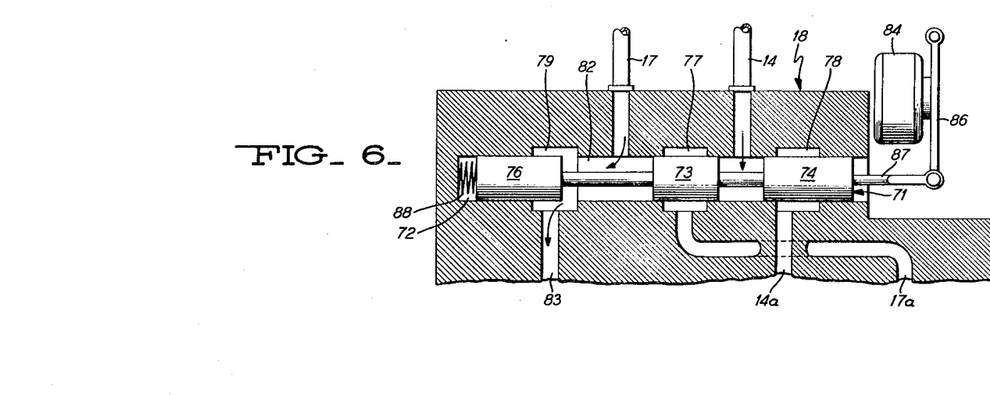
Fig. 6 is a diagrammatic view of the hydraulic drive of Fig. 5 with the control means by-passed.

Referring now to Figs. 5 and 6, there is shown a modified form of hydraulic control mechanism 18 which provides the facility for suppressed and continuous operation of the hydraulic motor 13. As shown, the first and second control valves 23 and 24 are identical in construction to the first example given and are operated in an identical manner. Therefore, with like parts given like reference characters, further detail description of these control valves and their operation is not deemed necessary.

Since the first control valve 23 must be reciprocated by the related cam 47 to effect operation of the motor 13, if the cam 47 is maintained stationary, operation of the motor may be suppressed for any desired period. This may be accomplished by controlling rotation of the cam 47 with a clutch 68 or other like type coupling device. Of course, with the clutch 68 engaged the first control valve 23 is operated in exactly the same manner as aforedescribed and with the clutch disengaged, motor operation is suppressed.

In order to provide for continuous and intermittent motor operation the hydraulic control mechanism 18 is modified to include a magnetically operated reciprocatable spool-type valve 71. The housing 19 in this instance is further provided with a cylindrical bore 72 in which the reciprocatable valve 71 is disposed. The spool valve 71 includes the usual central and spaced end lands 73, 74 and 76, respectively, which are adapted to overlap and control fluid flow through related recessed ports 77, 78 and 79, respectively.

In addition, the lands of the spool valve 71 cooperate with the cylindrical bore 72 to provide right and left-hand fluid conducting chambers 81 and 82, respectively, disposed on opposite sides of the central land 73. As shown in Fig. 5 the motor return conduit 17 is in direct communication with the chamber 82 while the motor by-pass conduit 14 communicates directly with the chamber 81. A first internal conduit or duct 17a formed within the housing 19 communicates the port 77 with the chamber 38 of the first control valve 23, while a second internal conduit 14a within the housing 19 communicates the port 78 with the chamber 39 of the first control valve 23. Hence it is seen that the motor return conduit 17 and the motor by-pass conduit 14 may be placed in communication with chambers 38 and 39, respectively, and therefore, the first and second control valves 23 and 24 may, as in the first example, operate the motor 13 as previously described.

Further, a conduit 83 is in direct communication with the port 79 and the reservoir 12; hence the valve 71 may be reciprocated to provide direct passage of fluid under pressure from the motor return conduit 17 to the reservoir 12 continuously. Likewise, the valve 71 may be reciprocated to permit the first and second control valves 23 and 24 to control operation of the motor 13 as previously described. In order to selectively reciprocate the valve 71 a magnet 84 is provided. The magnet 84 through its related armature 86, which is connected to the end of a valve stem 87 extending from the end land 74, is effective to reciprocate within limits the valve 71.

Disposed on the opposite side of the left-hand end land 76 is compression spring 88 to restore the armature 86 to a home position when the magnet 84 is de-energized and consequently reciprocate the control valve 71 to the right. Hence, with the magnet 84 deenergized the valve is in the position shown in Fig. 5 wherein the motor return conduit 17 and the motor by-pass conduit 14 are in communication with the chambers 38 and 39, respectively. The motor return conduit 17 communicates with the chamber 38 through the chamber 82, the port 77, and the internal conduit 17a, while the motor by-pass conduit 14 communicates with the chamber 39 through the chamber 81, the port 78, and the internal conduit 14a. Under these conditions and with the clutch 68 engaged the motor 13 will be operated under the control of the hydraulic mechanism 18 by means of the first and second control valves 23, and 24, as aforedescribed.

When the magnet 84 is energized, as shown in Fig. 6, the valve 71 is reciprocated to the left and the shifting center land 73 closes the port 77 and the right-hand end land 74 closes the port 78. At the same time the left-hand end land 76 opens the port 79 to permit fluid to pass from the motor return path 17 through chamber 82, the now open port 79 and the conduit 83 to the reservoir 12. An orifice 85 is provided in the conduit 83 to increase the normal motor operating pressure so that fluid pressure in the conduit 64 will be sufficient to actuate and hold the piston 66 to maintain the latch 57 out of engagement with the aligner wheels 59 and 61, respectively. Hence, under these conditions the operation of the control valves 23 and 24 have no affect upon the operation of the motor 13 and the motor 13 will continue to run so long as the magnet 84 remains energized.

From the foregoing it is seen that a drive has been provided which will rapidly move a load at a predetermined time and bring the same to rest precisely at a predetermined position and at the same time maintain inertia forces at a minimum. It is also seen that the drive provides rapid load displacement independent of fluid parameters and load torque fluctuations. Another important feature of the invention is that the drive will always displace the load a predetermined amount since operation of the valve for stopping the drive is directly controlled by the drive. Also rapid and smooth acceleration and deceleration is obtained through the use of orifices and light valves operating at reasonable speeds which are operated at only one-half the speed of the drive or load cycles, and therefore, the valve operation can be relatively slow to provide a rapid drive. Further, by changing the phase angle differences between the cams for operating the control valves rapid driving pulses of short duration can be provided. Moreover, the drive above-described with the minor modifications indicated can provide continuous, suppressed, or intermittent motion as desired.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus of the type described, a fluid-operated motor, a source of a constant volume of fluid for operating said motor, means for controlling the flow of fluid from said motor to initiate the starting and stopping thereof, comprising first valve means shiftable from a first to a second position; second valve means shiftable from a first to a second position; fluid connections between said fluid supply and said motor, said motor and said first valve means, and said first and second valve means to connect the same in series; means for shifting said first valve means from said first to said second position while said second valve means is in said first position thereby initiating the starting of said motor; and means for shifting said second valve from said first to said second position with said first valve means in said second position to effect the stopping of said motor.

2. A control for a fluid operated motor supplied with a constant volume of fluid from a fluid supply comprising first and second shiftable valve means connected for series conduction, by-pass means connected between said fluid supply and said first valve means, fluid conducting means providing communication between said first valve means and the discharge of said motor, means for shifting said first valve means with said second valve means in the initial position to cut off the by-pass and permit fluid to flow from said motor whereby the same starts to operate, and means for shifting said second valve at a predetermined time after shifting the first valve to permit fluid to by-pass said motor to stop the operation thereof.

3. A control for a fluid operated motor according to claim 2 wherein said second valve is operated by said motor to effect the stopping thereof.

4. The combination as in claim 2 including means for selectively bypassing said first and second control valves to direct fluid flow from said motor to permit continuous operation of the same.

5. A control for a fluid operated motor supplied with a constant volume of fluid from a fluid supply comprising a ported first valve means communicating with said motor to control the flow of fluid therethrough, by-pass means for diverting fluid flow to said motor directly to said first valve means, a second valve means having ports connected in series to the ports of said first valve means, a fluid reservoir, means for connecting the ports of said second valve means to said reservoir, and means for alternately operating said first and second valves in timed sequence to alternately start and terminate the passage of fluid from said motor through said first and second valve means to said reservoir and thereby initiate the starting and stopping of said motor.

6. In a hydraulic control apparatus, the combination of a driving member, a fluid conducting means hydraulically connected in parallel with said driving member, means for directing a constant volume of fluid to said driving member and said fluid conducting means, a pair of control valves connected in series, means for directing a volume of fluid from said driving means and said fluid conducting means to one of said control valves, means dependent upon movement of said one of said control valves for selectively directing a volume of fluid through the other of said control valves for transferring the flow of fluid from said fluid conducting means through said control valves to flow from said driving member through said control valves to permit the operation thereof, and means for operating said control valves with a phase angle difference therebetween.

7. In a hydraulic drive control apparatus the combination of a fluid operated motor supplied with a constant volume of fluid, by-pass means supplied with a constant volume of fluid and hydraulically connected in parallel with said fluid operated motor, a first control valve means communicating with said motor and said by-pass means to direct passage of fluid therefrom, a reservoir, a second control valve means hydraulically connected in series with said first control valve means and with said reservoir for directing passage of fluid from the first valve means to said reservoir, means for cyclically operating said first control valve means to direct flow of fluid from said motor and from said by-pass means to said second valve means with the same in an initial position to direct flow of fluid only from said motor to said reservoir, and means for operating said second control valve means after the motor operates a predetermined amount to shift said second control valve, thereby directing flow of fluid only from the by-pass means through the first and second control valves to said reservoir to stop operation of said motor.

8. In a hydraulic control apparatus, the combination of a fluid operated motor adapted to be cyclically accelerated to rated speed, decelerated and brought to rest, a ported first control valve, means for supplying a constant volume of fluid directly to said motor and to said first control valve, means for conducting fluid from said motor to said first control valve, a ported second control valve, means for interconnecting the ports of said first valve with the ports of said second valve for series flow of liquid therethrough, a reservoir connected to said second control valve, means for reciprocating said first valve with said second valve in an initial position to permit fluid to flow from said motor through said first and second valves to said reservoir to permit the motor to accelerate to speed, and means for reciprocating said second valve from the initial position after a lagging time interval to prevent fluid flow from said motor to the reservoir to cause said motor to stop.

9. Control apparatus for hydraulically operating a fluid motor comprising a first control valve including ports and a spool having lands to cover said ports, a second control valve including ports and a spool having lands to cover said ports, means for directing a constant volume of fluid to said motor and said first control valve, means for communicating the discharge of said motor with said first valve, means for communicating the ports of the first control valve with the ports of the second control valve, a first eccentric for reciprocating said first control valve in timed relation to permit fluid to flow from said motor through alternate ports thereof with said second valve in an initial position to permit operation of said motor, and a second eccentric for reciprocating said second control valve to alternately shift the same from said initial position to a second position to prevent further flow of fluid from said motor to stop the same, said eccentrics being disposed with the phase angle difference to permit fluid to flow from the motor for a predetermined time.

10. Control apparatus for hydraulically operating a fluid motor supplied with a constant volume of fluid from a fluid supply comprising a ported and chambered first control valve connected with the discharge of said motor and with the fluid supply, a ported and chambered second control valve, means for interconnecting said ports to provide series flow therethrough, a reservoir, means for connecting the chamber of said second control valve to the reservoir, and means for reciprocating said control valves with said second control valve lagging the first control valve by a predetermined phase angle difference whereby said first valve operates to permit fluid to flow from said motor to said reservoir through said second control valve to allow said motor to operate and said second valve operates to prevent flow of fluid from said motor to the reservoir through said first and second valves to stop operation of said motor.

11. Control apparatus for hydraulically operating a fluid motor supplied with a constant volume of fluid from a fluid supply comprising a first control valve having a central port, two end ports and chambers formed between said central and end ports wherein one of said chambers so formed is connected with the fluid supply and the other chamber is in fluid communication with said motor, a second control valve provided with two end ports and a chamber formed therebetween, means for interconnecting said ports of said first and second control valves to provide series flow therethrough, a reservoir, means for connecting the chamber of said second control valve to said reservoir, and means for reciprocating said first and second control valves with said second control valve lagging the first control valve by a predetermined phase angle difference whereby said first valve operates to permit fluid to flow from said motor through said first and second valves respectively to said reservoir to permit said motor to operate and said second valve operates to prevent flow of fluid from said motor to said reservoir through the first and second control valves to stop operation of said motor.

12. The combination as in claim 11 wherein said means for reciprocating said first and second control valves include independent cams operating with a predetermined phase angle difference therebetween whereby the cam for reciprocating the first control valve is continuously rotating and the cam for reciprocating the second control valve is rotated by said motor as the same operates.

13. The combination as in claim 9 wherein said means for reciprocating said control valves operate in a cyclic manner to provide two complete cycles of motor operation for each complete cycle of valve operation.

14. The combination as in claim 13 including means for selectively bypassing said first and second control valves to direct fluid flow from said motor directly to said reservoir to permit continuous operation of said motor.

15. A hydraulic drive arrangement comprising a fluid operated motor supplied with a constant volume of fluid and having an output drive element, a first aligner wheel having a plurality of notches arranged about the periphery thereof fixed to be rotated by said output drive element, a driven element, means for driving said driven element, a second aligner wheel fixed to be rotated by said driven element and having notches arranged about the periphery thereof and less in number than the number of notches in said first aligner wheel, a pivotally mounted latch biased to enter the notches of said first and second aligner wheels, valve means for controlling flow of fluid from said motor to control the operation of the same, and hydraulic means operable in response to starting of the motor for actuating said latch to disengage the same from the notches of the aligner wheels whereby after starting of the motor, the latch remains disengaged as the same rides along the periphery of the second aligner wheel and re-engages the first and second aligner wheels as the motor is caused to stop by said valve means.

16. A hydraulic drive arrangement comprising a fluid operated motor supplied with a constant volume of fluid and having an output drive element, a first aligner wheel adapted to be rotated by said fluid operated motor, a second aligner wheel adapted to be rotated by said fluid operated motor, latch means normally biased to lock said first and second aligner wheels against rotation, valve means for selectively controlling flow of fluid from said motor to control operation of the same, and means operable in response to starting of the motor for operating said latch means to permit rotation of said aligner wheels, whereby after the starting of said motor said second aligner wheel operates the latch to permit rotation of the first and second aligner wheels and as the motor is caused to stop the second aligner wheel operates the latch to prevent rotation of the first and second aligner wheels.

17. Apparatus of the type described, a fluid-operated motor, a source of a constant volume of fluid for operating said motor, means for controlling the flow of fluid from said motor to initiate the starting and stopping thereof, comprising first valve means shiftable between first and second positions; second valve means shiftable between first and second valve positions; fluid connections between said fluid source and said motor, said motor and said first valve means, and said first and second valve means to connect the same in series; means for shifting said first valve means in a timed sequence between said first and second positions; and means for shifting said second valve means between said first and second position at a predetermined time after said first valve means has been shifted, shifting of said first valve means from the first to the second position thereof with said second valve means in the first position thereof initiates starting of the motor and subsequently shifting said second valve means to the second position thereof causes the stopping of said motor, and shifting of said first valve means from the second to the first position thereof with said second valve means in the second position thereof also initiates the starting of said motor and subsequently shifting said second valve means to the first position thereof again causes the stopping of said motor.

18. Apparatus of the type described comprising a source of a constant volume of fluid, a fluid-operated motor connected to said fluid source, a ported and chambered shiftable first control valve connected with the discharge of said motor and with said fluid source, a fluid reservoir, a fluid conductor connected with said first valve and said reservoir, a ported and chambered shiftable second control valve, means for connecting certain of the ports of said first valve with the chambers of said second valve to provide fluid paths therebetween, a ported and chambered shiftable third control valve, means for connecting the ports of the second valve with the ports of said third valve to provide fluid paths therebetween, means for connecting the chamber of said third valve to said reservoir to provide a fluid path thereto, means for selectively shifting said first valve to selectively place the discharge of said motor in communication with said reservoir and with said second valve, means for selectively shifting said second control valve, and means for shifting said third control valve at a predetermined time after the shifting of said second control valve so as to control the starting and stopping of said motor when the same is placed in fluid communication with the second valve by means of the first valve.

19. Apparatus of a type described comprising a source of constant volume of fluid; a fluid-operated motor connected to said fluid source; a first control valve including a central and two end ports with fluid chambers communicating said central port with the end ports and a shiftable spool having a central and two end lands adapted to cover the ports to exclude communication with the chambers; means for normally biasing said first valve whereby one of the end lands covers one of the end ports to exclude communication thereof with one of the chambers, said central land permitting communication of said central port with said one of the chambers, the other end land permitting communication of the other end port with the other chamber; a fluid conductor connected to the discharge of said motor and to said one chamber; a fluid conductor connected to said fluid supply and to said other chamber; a reservoir for fluid; a fluid conductor connected with said reservoir and with said one of the end ports of said first valve; a second control valve including a central and two end ports with fluid chambers communicating said central port with the end ports and a shiftable spool having a central land and two end lands adapted to cover the end ports to exclude communication with said chambers, said central land adapted to place the central port in communication with one of said chambers; means for normally biasing said second valve whereby one of the end lands is in position to permit communication of one of the end ports with one of the fluid chambers and the other of said end lands is in position to exclude communication of the other of said end ports with the other of said chambers, said central land being in position to place the central port in communication with said other chamber; a fluid conductor connected to said central port of the first valve and said other chamber of the second valve; a fluid conductor connected to said other end port of the first valve and said one chamber of the second valve; a third control valve including two end ports with a fluid chamber communicating said end ports and a shiftable spool having two end lands adapted to cover the end ports to exclude communication of the end ports with said chamber; means for normally biasing said third valve whereby one of the end lands is in position to place one of said end ports in communication with the chamber and the other of the end lands is in position to cover the other of said end ports to exclude the same from communication with the chamber; fluid conductors connecting the end ports of said second control valve with said one end port of the third control valve; a fluid conductor connecting the central port of said second valve with said other end port of the third valve; a fluid conductor connecting the chamber of said third valve with the reservoir; means for selectively shifting said first valve whereby said one end land is in position to place said one end port in communication with said one chamber and said central land covers said central port and said other end land covers said other end port of the first valve so as to permit continuous flow of fluid from the motor to the reservoir; means for selectively shifting said second valve to place said one end land in position to cover said one end port, to place said central land in position to communicate said central port with said one chamber, and to place said other end land in position to communicate said other end port with said other chamber so as to permit fluid to flow from the motor to the reservoir when said first and third valves are in their normally biased position; means for shifting said third valve a predetermined time after the shifting of said second valve so as to exclude communication of said end port with the chamber and to place said other end port in communication with the chamber and thereby cut off flow of fluid from the motor to the reservoir to stop the operation of the motor.

20. Appartus of the type described according to claim 19 further comprising an output shaft connected to be driven by said motor; a first aligner wheel having a plurality of notches arranged about the periphery thereof fixed to be rotated by said output shaft; a driven element; means for driving said driven element in direct relationship with the shaft driven by said motor; a second aligner wheel fixed to be rotated by said driven element and having notches arranged about the periphery thereof, said notches being less in number than the number of notches in the first aligner wheel; a pivotally mounted latch having a spaced pair of arms adapted to enter the notches of said first and second aligner wheels; means for normally biasing said latch whereby the arms thereof are caused to engage the notches of said first and second aligner wheels; a fluid-operated piston disposed to engage said latch in opposition to the means for biasing said latch; a fluid conductor for slidably supporting said piston and connected to said source of fluid; an orifice disposed in the fluid conductor connecting the discharge of said motor with said one chamber of said first valve and an orifice connected in the fiuid conductor connected with said reservoir and with said one end port of the first valve, said orifices providing sufficient back pressure upon the motor, upon the starting thereof, so as to apply sufficient fluid pressure on the piston to cause the same to force the latch out of engagement with said aligner wheels, said second aligner wheel being adapted to hold the latch out of engagement with the notches of the first aligner wheel during operation of the motor.

21. Apparatus of the type described comprising a source of constant volume of fluid; a fluid-operated motor connected to said fluid source; a first control valve including a central and two end ports with fluid chambers communicating said central port with the end ports and a shiftable spool having a central and two end lands adapted to cover the ports to exclude communication with said chambers; a fluid conductor connected between the discharge of said motor and one chamber of said chambers of said first valve; a fluid conductor connected to said fluid source and the other chamber of said fluid chambers of said first valve; a second control valve including two end ports with a fluid chamber connecting said end ports and a shiftable spool having two end lands adapted to cover the ports to exclude communication with said chamber; fluid conductors connected to the end ports of said first valve and to one of the end ports of said second valve; a fluid conductor connected to the central port of said first valve and to the other end port of said second valve; a fluid reservoir; a conductor connected to said fluid reservoir and to the chamber of said second valve; means for reciprocating said first and second control valves with said second control valve lagging the first control valve by a predetermined phase angle difference whereby said first valve is shifted to permit fluid to flow from said motor to said reservoir via said first and second valves respectively to initiate operation of said motor, and subsequently said second valve is shifted to cut off flow of fluid from said motor to said reservoir through the first and second control valves so as to stop operation of said motor.

22. Apparatus of the type described according to claim 21 further comprising an output shaft connected to be driven by said motor; a first aligner wheel having a plurality of notches arranged about the periphery thereof fixed to be rotated by said output shaft; a driven element; means for driving said driven element in direct relationship with the shaft driven by said motor; a second aligner wheel fixed to be rotated by said driven element and having notches arranged about the periphery thereof, said notches being less in number than the number of notches in the first aligner wheel; a pivotally mounted latch having a spaced pair of arms adpted to enter the notches of said first and second aligner wheels; means for normally biasing said latch whereby the arms thereof are caused to engage the notches of said first and second aligner wheels; a fluid-operated piston disposed to engage said latch in opposition to the means for biasing said latch; a fluid conductor for slidably supporting said piston and connected to said source of fluid; an orifice disposed in the fluid conductor connecting the discharge of said motor with said one chamber of said first valve and an orifice connected in the fluid conductor connected with said reservoir and with said one end port of the first valve, said orifices providing sufficient back pressure upon the motor, upon the starting thereof, so as to apply sufficient fluid pressure on the piston to cause the same to force the latch out of engagement with said aligner wheels, said second aligner wheel being adapted to hold the latch out of engagement with the notches of the first aligner wheel during operation of the motor.

References Cited in the file of this patent

UNITED STATES PATENTS

| | | |
|---|---|---|
| 2,326,184 | Vickers | Aug. 10, 1943 |
| 2,750,929 | Bronson | June 19, 1956 |
| 2,789,542 | Vander Kaay | Apr. 23, 1957 |

UNITED STATES PATENT OFFICE
CERTIFICATE OF CORRECTION

Patent No. 2,938,501                                          May 31, 1960

Stanley C. Titcomb

It is hereby certified that error appears in the printed specification of the above numbered patent requiring correction and that the said Letters Patent should read as corrected below.

Column 2, line 6, for "pars" read -- parts --; column 4, line 39, for "aligned" read -- aligner --; column 14, line 41, for "adpted" read -- adapted --.

Signed and sealed this 11th day of April 1961.

(SEAL)
Attest:
ERNEST W. SWIDER
Attesting Officer

ARTHUR W. CROCKER
                                                     Acting Commissioner of Patents